June 10, 1941.  C. G. GERHOLD  2,245,143
TREATMENT OF OLEFIN HYDROCARBONS
Filed April 13, 1939
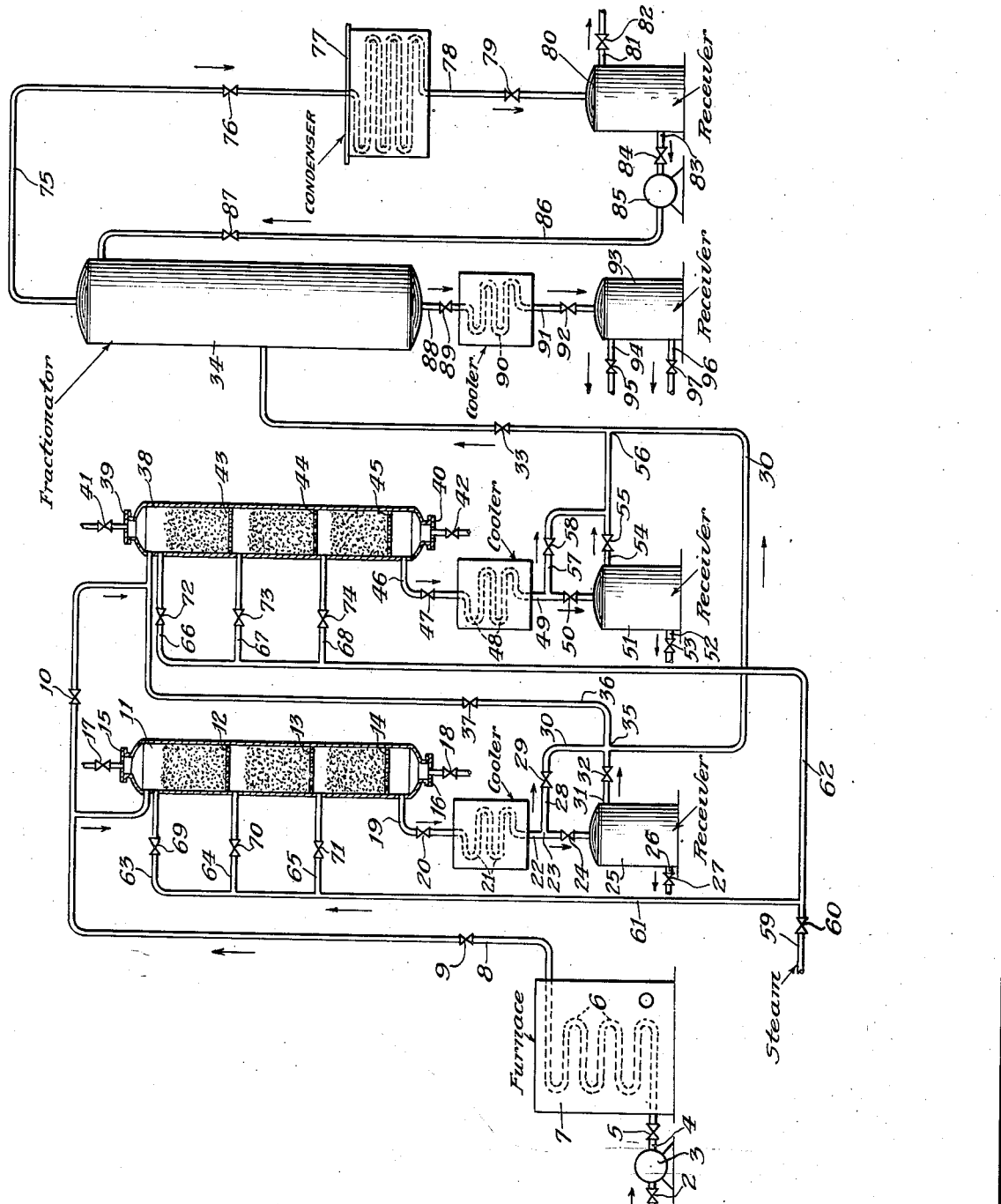
Inventor:
Clarence G. Gerhold,
By: Lee J. Gary
Attorney.

Patented June 10, 1941

2,245,143

UNITED STATES PATENT OFFICE 2,245,143

TREATMENT OF OLEFIN HYDROCARBONS

Clarence G. Gerhold, Chicago, Ill., assignor to Universal Oil Products Company, Chicago, Ill., a corporation of Delaware Application April 13, 1939, Serial No. 267,533

12 Claims. (Cl. 196—10)

This invention relates particularly to the treatment of olefinic hydrocarbons which are normally gaseous at ordinary temperatures and pressures, although it may be applied as well to liquid olefin hydrocarbons.

In a more specific sense the invention is concerned with improvements in processes wherein olefin hydrocarbons are polymerized in the presence of granular catalytic materials to produce good yields of relatively low molecular weight polymers utilizable as high antiknock blending material for motor fuels or hydrogenatable to corresponding paraffinic hydrocarbons which retain to a large extent the high antiknock characteristics of the liquid olefins while being more resistant to the action of acids, such as sulfuric acid, because of their saturated character.

A comparatively recent commercial development is the manufacture of motor fuel fractions and particular compounds from normally gaseous olefins. This has been accomplished more or less efficiently by both thermal treatment and by the use of catalysts. The latter type of operation permits use of lower pressures and temperatures in the presence of properly chosen catalysts and results generally in increasing the capacity and efficiency of commercial plants. Among the types of catalysts which have been employed may be mentioned metal halides such as, for example, aluminum chloride, zinc chloride, and mineral acids, including sulfuric and phosphoric.

The present process provides for more effectively utilizing the olefinic constituents of commercial hydrocarbon mixtures, particularly those occurring in the gases from oil cracking processes to produce valuable derivatives therefrom. It may be applied also to individual olefins produced by special chemical methods or by fractionation of mixtures.

The present invention is concerned particularly with improvement in the use of solid granular catalysts, especially in the use of a certain type of such catalysts which will be described more in detail in a later section of the specification, and also with the proper choice of operating conditions, so as to obtain maximum catalyst life.

In one specific embodiment the present invention comprises treatment of olefin-containing hydrocarbon mixtures at elevated temperatures and pressures, to produce polymers therefrom utilizable as motor fuel, with solid catalysts or contact materials comprising phosphoric acid and relatively inert and generally siliceous carrying or spacing materials of porous and adsorptive character, while adding regulated amounts of water or steam to said olefin-containing hydrocarbon mixtures at intermediate points along the line of flow in the catalyst chambers, preferably between separate sections of the catalyst to control the composition of the acid, and thereby retard deterioration of the activity of the catalyst, and materially reduce deposition thereon of carbonaceous materials.

The feature of thus adding steam or water vapor at intermediate points in catalytic polymerization towers, preferably between separate sections of catalysts therein to control the humidity of the gas mixture undergoing treatment and thereby prevent loss of catalyst activity, has been found particularly necessary in the case of processes in which the olefins in cracked gas mixtures are exposed to the action of so-called "solid phosphoric acid" catalysts, and is also applicable when employing other granular catalysts that lose water in service.

In its broadest aspect, the present invention comprises an improvement in processes employing any type of catalyst whose activity is conditioned by its degree of hydration. In various types of exothermic reactions wherein the temperature in commercial equipment rises due to retarded dissipation of heat of reaction, the addition of water or steam at intermediate points in the flow to counter-balance the tendency of the catalyst to undergo dehydration and lose activity falls within the scope of the present invention. A further reason for the addition of water along the line of flow in processes employing such catalysts is that there is a drop in pressure due to normal frictional losses and therefore a decrease in the partial pressure of the water vapor present in a mixture of gases or vapors undergoing reaction so that the addition of water or steam may be necessitated even though no exothermic heat is involved. While the principal description given in the following paragraphs is in connection with use of solid phosphoric acid catalysts for polymerization reactions, the present improvement is, however, applicable to processes such as polymerization, isomerization, and alkylation utilizing such catalysts as liquid phosphoric acid, sulfuric acid, and other types of catalysts whose activity depends upon the maintenance of a critical degree of hydration.

The following description of an operation of this improvement in the polymerization process is given in connection with the so-called "solid phosphoric acid" catalysts, although it is to be understood that the feature of the process may be applied readily to operations employing any type of solid polymerizing catalyst which suffers less in activity through dehydration. To assist in the description of the process as it is operated in one particular instance, the attached diagrammatic drawing has been provided which shows by the use of conventional figures in general side elevation and without regard to exact relationships in the size of the units indicated an arrangement of plant equipment which may be employed.

Referring to the drawing, olefin-containing hydrocarbon mixtures such as, for example, the fractions produced as overhead in the stabilization of primary cracked naphthas or gasolines commonly known as "stabilizer reflux" are admitted through line 1 containing control valve 2 to a feed pump 3 which discharges through line 4 containing control valve 5 into and through a preliminary tubular heating element 6 arranged to receive heat from a furnace 7. Stabilizer refluxes, such as mentioned which will consist mainly of 3 and 4 carbon atom hydrocarbons including propane, propene, butanes, and butenes, may be pumped conveniently in liquid phase from the stabilizer reflux drum or may be taken in vapor form from such receivers and brought to the required pressures by a suitable compressor.

It has been determined that the maintenance of correct humidity is of primary importance in polymerizing propene and butenes from stabilizer reflux with "solid phosphoric acid" or similar catalysts, the exact humidity necessary for any particular gas mixture to produce maximum yields of gasoline boiling range polymers varying with the polymerization temperature used and the pressure under which this reaction is effected. Of the olefins present in such blends, isobutene is the most easily polymerized and next in order of reactivity are the n-butenes, propene, and ethylene which may be present in solution. The ordinary range of temperatures utilizable for stabilizer refluxes of average composition is usually within the range of 350–550° F., although in case selective and successive polymerization of individual olefins is desired the temperature in the initial catalyst chamber of the polymerization plant may be between 100 and 350° F.

By trial it has been found that solid phosphoric acid catalysts, which will be described later in detail, have vapor pressures of less than 2 millimeters of mercury at 302° F., whereas this increases to 760 millimeters at 428° F. When utilizing these catalysts in polymerization processes, it has been found necessary to add water vapor or steam to stabilizer reflux being polymerized, sufficient to substantially prevent dehydration of the catalyst and the accompanying decline in polymerizing activity. If this is not done the catalyst during use at elevated temperatures and pressures undergoes dehydration with a resultant loss in catalyst activity which is followed by deposition upon such partially dehydrated catalysts of heavy polymers and carbonaceous materials which eventually render the catalysts inactive. Proper humidification of the olefin-containing gas mixture undergoing polymerizing treatment in the catalyst tower prevents this adverse dehydration and fouling of the catalyst. From the above discussion it is evident that there is a proper degree of humidification of the gas necessary for obtaining optimum polymerization at each catalyst temperature and pressure condition. Thus it is necessary to add more steam to gas being polymerized at a high temperature than is necessary for one undergoing catalytic polymerization at a relatively lower temperature. Also at a lower pressure, such as occurs near the exit end of a catalyst tower, it is necessary to introduce more steam to maintain the same partial pressure of water vapor.

In the illustrative apparatus shown, the heated products from heater 6 pass through a line 8 containing control valves 9 and 10 to catalytic tower 11 containing several catalyst sections, indicated diagrammatically as three supported by perforated plates or screens 12, 13, and 14. Catalyst tower 11 is closed at either end by manhole covers 15 and 16 provided with valves 17 and 18. Liquid products and unconverted gas are conducted from the bottom of tower 11 through line 19 and valve 20 to cooler 21 connected to rundown line 22 and passed through T 23 and valve 24 to receiver 25. The cooler 21 will be used only to reduce the temperature of the products to a point most favorable to the operation of the second catalyst chamber following in case the plant is being operated with series flow, while in the case of properly diluted entering gas mixtures a great deal of cooling may not be applied at this point and the receiver 25 will merely serve to accumulate a small portion of high-boiling compounds more or less as drips, these being removable through a line 26 containing control valve 27. Receiver 25 is also provided with a vapor outlet line 31 containing control valve 32 and leading to line 30 which is provided with a control valve 33 and leads to an intermediate point in fractionator 34.

In case it is not desirable to collect part of the product in receiver 25, control valve 24 is closed so that the products leaving the cooler 21 pass from rundown line 22 into line 28 containing valve 29 and from thence pass into line 30 already mentioned. Further treatment of olefin-containing gases leaving the first catalyst tower is effected by conducting the exit gas from line 30 through cross-connection 35 and line 36 provided with control valve 37 to the top of the next catalyst tower; namely, 38 which is closed by manhole covers 39 and 40 provided with valves 41 and 42. The gas entering tower 38 passes downwardly through the several catalyst sections, indicated diagrammatically as three, supported by perforated plates or screens 43, 44 and 45. From the bottom of this catalyst tower products and treated gases are conducted through line 46 containing control valve 47 through cooler 48 and rundown line 49 provided with control valve 50 to receiver 51 from which liquid products may be withdrawn through draw-off line 52 containing valve 53 and non-liquefied gases may be released through line 54 containing control valve 55 to T 56 in line 30 connected through valve 33 with fractionator 34. In case it is not desired to collect any liquid product in receiver 51 control valve 50 is closed so that material from rundown line 49 enters line 57 containing valve 58 and passes from thence into line 54 beyond valve 55 and is conducted through T 56 already mentioned into line 30 and thence to the fractionator 34.

Proper humidification of the gas or stabilizer reflux charged to either or both of the catalyst towers is maintained by admission of controlled amounts of steam or water from an external source through line 59 containing control valve 60 and from hence through lines 61 and 62 to branch lines 63 to 68, inclusive, containing control valves 69 to 74, inclusive, which are connected to catalyst towers 11 and 38 at intermediate points preferably communicating with the vapor space above each of the separately supported catalyst sections. Proper control of the steam or water admitted through valves 69, 70 and 71, respectively, maintains the desired degree of humidification in the top, center, and bottom catalyst sections of tower 11, while like manipulation of valves 72, 73 and 74, respectively, effect similar control in the top, center, and bottom catalyst sections of tower 38.

The exact quantity of steam or water to be admitted at any of these intermediate points in the catalyst tower is determined by the catalyst temperature therein employed, together with the moisture content of the gas stream entering the particular catalyst tower section in question. It is necessary to avoid adding too large a quantity of steam in the first catalytic section where the catalyst temperature may be in the order of 325 to 350° F., because of the fact that the catalyst, being strongly hydroscopic, readily takes up moisture and becomes softened at this low temperature. Because of this danger of softening of the catalyst it is advisable to always keep the water content of the gas below the approximate saturation value. Care must be taken also that sufficient moisture be added at the intermediate points to take care of the temperatures there existing due to the heat contained in the gas admitted and to the exothermic heat of the polymerization. Usually the quantity of aqueous fluid, that is, water or steam or both, to be added to the gas undergoing polymerization is within the range of 1 to substantially 6% by volume of the olefin-containing gas. These critical percentages given are only approximate and obviously will depend upon a number of factors best determined by trial.

By proper control of valve 10 in line 8 it is possible to operate the polymerization plant; which may contain more than two catalyst towers, although for descriptive purposes the diagrammatic drawing shows only two; so that the respective towers may be used in parallel flow in which case it might be advantageous to pass the total products and treated gases to fractionator 34 by by-passing receivers 25 and 51 by proper control of the valves in the lines attached thereto.

In the case of vapor phase operation of the catalyst towers described with intermediate separation of the products by stepwise and successive polymerization there may be only a relatively small quantity of material for the final fractionation as most of the liquid products may be collected in receivers 25 and 51, but in case these receivers are by-passed all of the fractionation may be accomplished in the final step in fractionator 34. For segregating the products in either event into liquid gasoline boiling range fractions, fixed gases and substantially unreactive paraffinic intermediates, the fractionator 34 has been indicated diagrammatically having a vapor line 75 containing control valve 76 which leads through a condenser 77 to a rundown line 78 equipped with control valve 79 and leading to a distillate receiver 80 having a gas release line 81 containing control valve 82 and provided with a liquid drawoff line 83 containing control valve 84 leading to pump 85 through line 86 containing valve 87 to the top of the fractionator 34 by means of which reflux to the fractionator may be controlled.

The material withdrawn from the bottom of the fractionator 34 will constitute the total polymer product in case receivers 25 and 51 have been by-passed, and the lighter portion of the polymer product corresponding to the final stage of polymerization when these other two receivers are utilized. The total polymer product may require further fractionation in more complicated apparatus than that shown in the drawing and the use of such is comprised within the scope of this invention. However, as shown, the material from the bottom of fractionator 34 passes through line 88 containing control valve 89 through cooler 90 and thence through rundown line 91 containing control valve 92 to receiver 93 which is equipped with a conventional gas release line 94 containing control valve 95 and a liquid draw line 96 provided with control valve 97.

Solid phosphoric acid catalysts which are particularly utilizable in the present improved polymerization process may be made by mixing an acid of phosphorus, such as ortho or pyrophosphoric acid, with a finely divided relatively inert and generally a siliceous carrier such as, for example, kieselguhr to form a rather wet paste, the acid ordinarily being in major proportion by weight; calcining at temperatures in the order of 752 to 932° F., to produce a solid cake; grinding and sizing to produce particles of a usable mesh; and rehydrating the catalyst granules at temperatures of the order of 510° F., to produce an acid composition corresponding to optimum polymerizing activity which usually corresponds approximately to the pyro-acid in composition. This catalyst preparation procedure may be varied by forming particles from the original paste by extrusion or pelleting methods and following with the calcining and rehydrating steps. In the reactions taking place during calcination it is evident that some acid is "fixed" on the carrier and that some meta-phosphoric acid, which is substantially without polymerizing activity, is formed. The rehydrating step evidently produces an acid composition corresponding closely to the pyro-acid having a formula $H_4P_2O_7$. Unless rehydration is practiced, the temperature of approximately 572° F. should not be exceeded in the calcination step. And if higher temperatures produce catalyst particles of greater structural strength depending upon the character of the carrier and the proportion of acid mixed therewith, the composition of the acid may be brought to the desired point by contact with superheated steam at approximately 510° F. This brief description of a solid phosphoric acid catalyst and of its preparation is not exhaustive as both have been described already in United States Patents No. 1,993,512, No. 1,993,513 and others.

The following examples are given to show the need for a process of the present character to maintain proper degrees of humidification in different sections of catalyst towers containing solid phosphoric acid catalysts to prevent their unnecessary losses in polymerizing activity through dehydration, and also to prolong the active life of such catalysts through decreasing deposition of carbonaceous materials thereon, though it is not intended that the examples should limit the scope of the invention correspondingly.

Runs were conducted in a commercial plant upon a stabilizer reflux having the following average composition:

*Composition of the charge*

| | Per cent |
|---|---|
| Iso-butene | 6 |
| N-butenes | 12 |
| Butanes | 34 |
| Propene | 17 |
| Propane | 31 |

A polymerization catalyst operating upon the above described stabilizer reflux without the addition of water or steam at any point lost a major portion of its activity and at the same time underwent an increase of 5% by weight due to carbonaceous materials during 48 hours of operation. A like sample of the same catalyst under similar conditions except for the fact that the gas being charged was properly hydrated at several intermediate points in the catalyst tower showed no decrease in activity over a period of 16 days and during that time increased in weight only 1.5%. From these data it is concluded that the rate of fouling of the catalyst is a function of the moisture content of gas being processed and more than this, that a partially dried or dehydrated catalyst possesses an abnormally high and detrimental ability to promote deposition thereon of heavy polymers and carbonaceous materials as compared to a catalyst operated on properly hydrated charging stocks.

In a second example, two other commercial polymerization plants consisting of three towers each were operated under identical conditions except for the fact that in the first plant, steam was added at intermediate points in each of the three towers, while in the second plant, steam was added simply to the charge entering the first tower. After a period of use during which the catalyst activities decreased to about the same extent, reactivation treatment was applied to each of the two plants. The catalyst which had been operated on a gas properly humidified in each of the three towers, reactivated satisfactorily by burning for 2.5 days at 842–932° F., in an atmosphere of controlled oxygen content followed by steaming for 24 hours at 510° F., while the other catalyst required 7 days for a like reactive burning. Later tests in the second plant with proper humidification at intermediate points in all three towers showed that the reactivation time was also reduced materially over that observed when operating without proper humidity control.

The nature of the present invention and its commercial utility can be seen from the specification and examples given, although neither section is intended to unduly limit the generally broad scope of this invention.

I claim as my invention:

1. In catalytic processes wherein a reactant is passed through a hydrated catalyst which tends to deteriorate by dehydration under the operating conditions of the process, the improvement which comprises adding to said reactant, at spaced points in its path of travel through the catalyst, sufficient quantities of aqueous fluid to substantially prevent loss of water from the catalyst.

2. The process as defined in claim 1 further characterized in that said catalyst comprises phosphoric acid.

3. The process as defined in claim 1 further characterized in that said catalyst comprises sulfuric acid.

4. A process for polymerizing olefins which comprises passing the olefinic material under polymerizing conditions through a solid phosphoric acid catalyst containing water of hydration and adding to the olefinic material, at spaced points in its path of travel through the catalyst, sufficient quantities of aqueous fluid to substantially prevent loss of water from the catalyst.

5. A process for the conversion of normally gaseous olefins into liquid hydrocarbons, which comprises subjecting said olefins under polymerization conditions of temperature and pressure to contact with a granular solid phosphoric acid catalyst and introducing an aqueous fluid at intermediate points along the line of flow at such a rate that at the operating temperature and pressure conditions loss of water from said catalyst is substantially prevented.

6. A process for the conversion of normally gaseous olefins into liquid hydrocarbons, which comprises subjecting said olefins under polymerization conditions of temperature and pressure to contact with a granular solid phosphoric acid catalyst while introducing aqueous fluid at intermediate points along the line of flow at such a rate as to substantially prevent conversion of said catalyst into meta-phosphoric acid.

7. In a process for the conversion of the olefin content of normally gaseous hydrocarbon fractions into liquid polymers, wherein said hydrocarbon fractions are subjected under polymerizing conditions to contact with a granular solid phosphoric acid catalyst contained in a vertical tower, the improvement which comprises adding aqueous fluid at intermediate points along the line of flow in the catalyst tower at such a rate that the vapor pressure of the catalyst at the operating temperature and pressure conditions is balanced substantially throughout the tower and loss of catalyst activity is substantially prevented.

8. In processes involving the conversion of organic compounds in which phosphoric acid catalysts are employed whose activity depends upon the maintenance therein of a critical degree of hydration, the improvement which comprises introducing sufficient water at a plurality of successive points in the line of flow of said processes to maintain the degree of hydration substantially at said critical degree of hydration.

9. In processes involving the conversion of hydrocarbon compounds in which phosphoric acid catalysts are employed whose activity depends upon the maintenance therein of a critical degree of hydration, the improvement which comprises introducing sufficient water at a plurality of successive points in the line of flow of said processes to maintain the degree of hydration substantially at said critical degree of hydration.

10. In processes involving the conversion of organic compounds in which sulfuric acid catalysts are employed whose activity depends upon the maintenance therein of a critical degree of hydration, the improvement which comprises introducing sufficient water at a plurality of successive points in the line of flow of said processes to maintain the degree of hydration substantially at said critical degree of hydration.

11. In processes involving the conversion of hydrocarbon compounds in which sulfuric acid catalysts are employed whose activity depends upon the maintenance therein of a critical degree of hydration, the improvement which comprises introducing sufficient water at a plurality of successive points in the line of flow of said processes to maintain the degree of hydration substantially at said critical degree of hydration.

12. In the polymerization of normally gaseous olefins in the presence of solid phosphoric acid catalyst, the method which comprises passing a stream of olefinic gas serially through a plurality of beds of the solid phosphoric acid catalyst and introducing a separate and independently controlled quantity of aqueous fluid to said stream in advance of its passage through each of the catalyst beds to prevent substantial dehydration of the phosphoric acid.

CLARENCE G. GERHOLD.